Nov. 21, 1939.  J. G. BLUNT  2,180,392
RAILWAY VEHICLE
Filed April 15, 1937  4 Sheets-Sheet 1
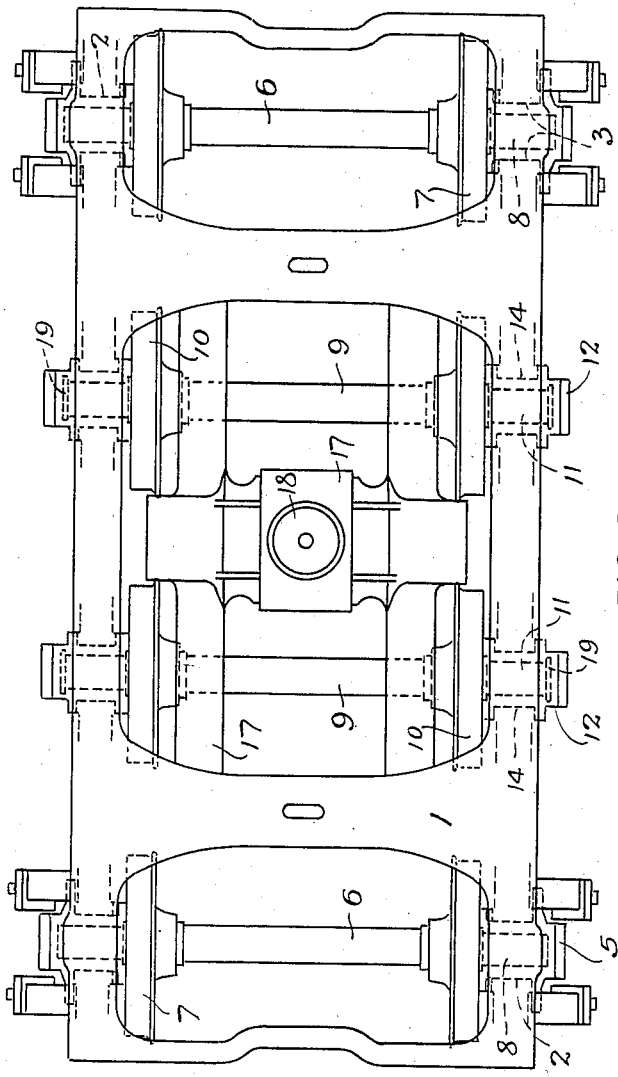
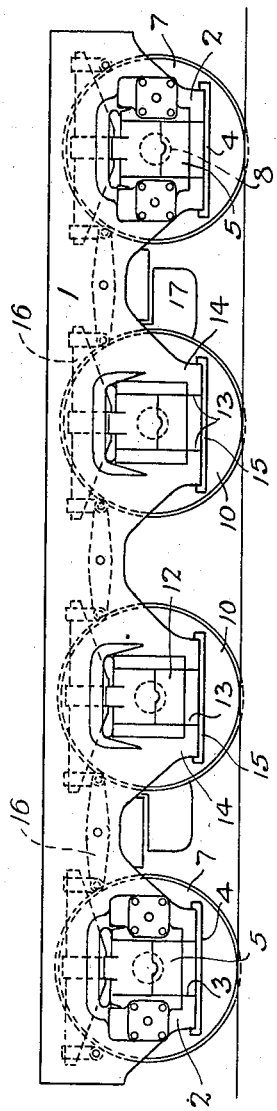
INVENTOR
James G. Blunt
BY
J.C. Yeaton
ATTORNEY Nov. 21, 1939.  J. G. BLUNT  2,180,392
RAILWAY VEHICLE
Filed April 15, 1937   4 Sheets-Sheet 2

INVENTOR
James G. Blunt
BY S. C. Eaton
ATTORNEY

Nov. 21, 1939.　　　　　J. G. BLUNT　　　　　2,180,392
RAILWAY VEHICLE
Filed April 15, 1937　　　4 Sheets-Sheet 3
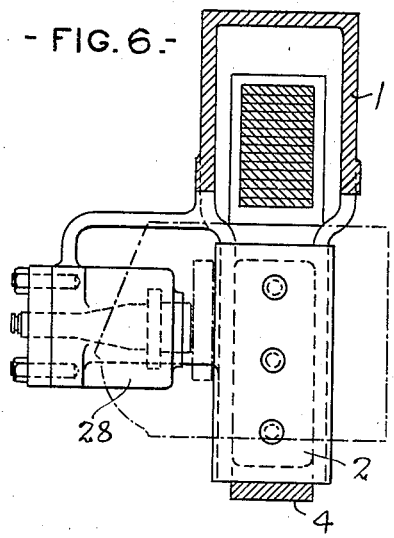
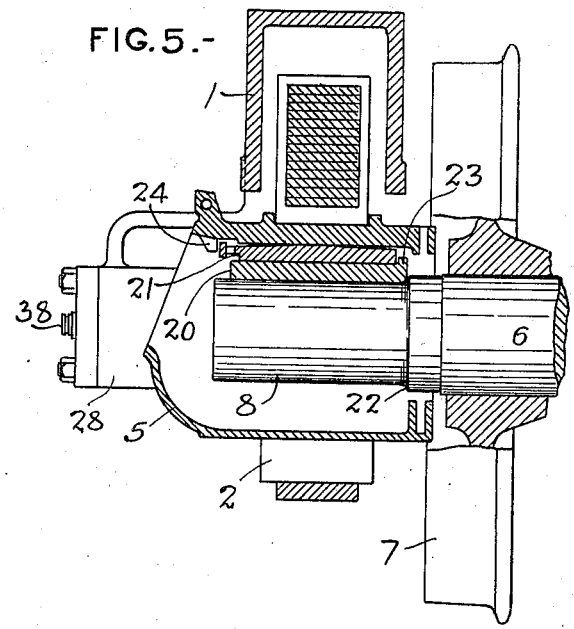
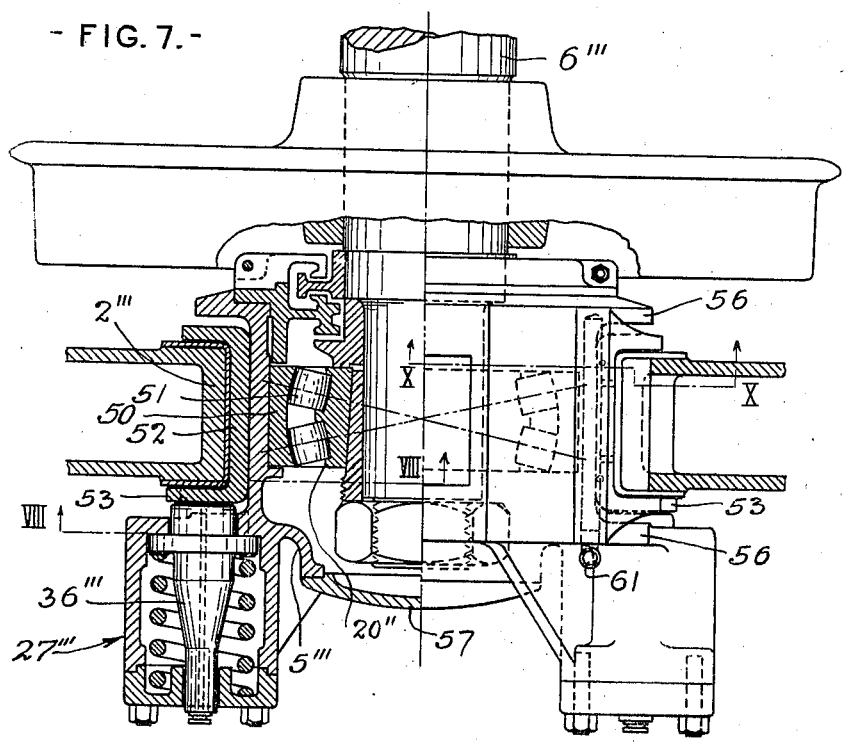
INVENTOR
James G. Blunt
BY S. C. Yeaton
ATTORNEY Nov. 21, 1939.　　　　J. G. BLUNT　　　　2,180,392
RAILWAY VEHICLE
Filed April 15, 1937　　　4 Sheets-Sheet 4
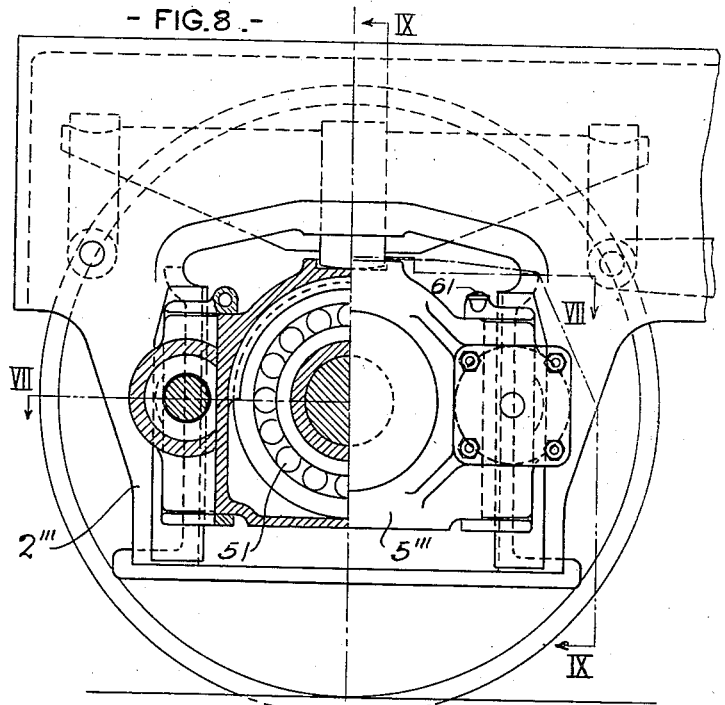
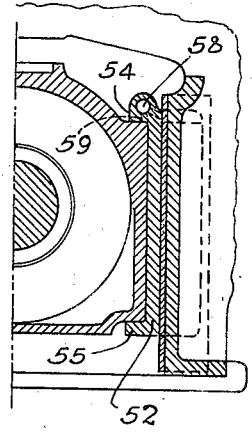
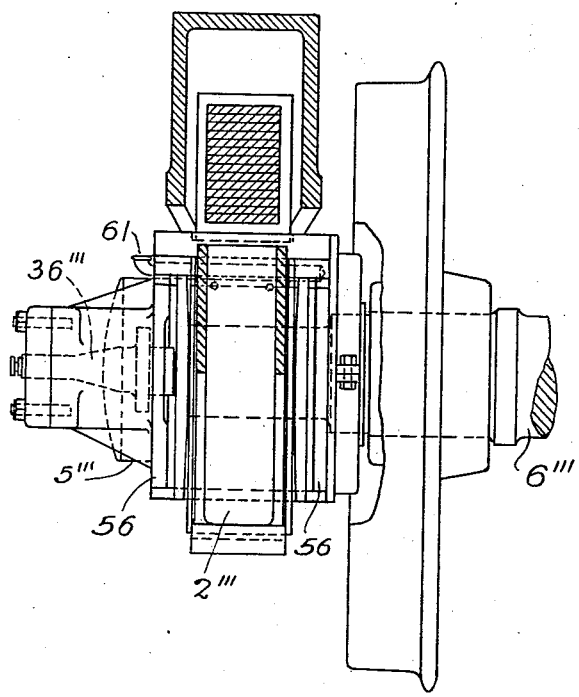
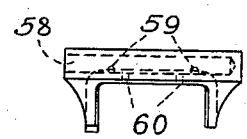
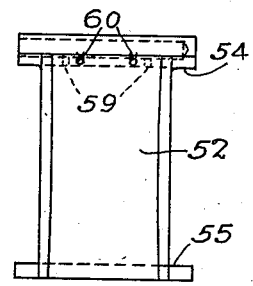
INVENTOR
James G. Blunt
BY S. C. Yeaton
ATTORNEY Patented Nov. 21, 1939

2,180,392

UNITED STATES PATENT OFFICE 2,180,392

RAILWAY VEHICLE

James G. Blunt, Schenectady, N. Y., assignor to American Locomotive Company, New York, N. Y., a corporation of New York Application April 15, 1937, Serial No. 136,967

3 Claims. (Cl. 105—222)

This invention relates to railway vehicles, and more particularly to the running gear of the type wherein means are provided for yieldingly resisting the forces originating at the wheel flanges when the vehicle is passing on curved track whereby shocks produced by these forces tending to move an axle and its wheels in a direction relative to and laterally of the frame of the vehicle will be cushioned, and the axle and wheels will be returned to normal central position when the force is removed, that is when the vehicle enters tangent track.

An object of the invention is to provide a novel combination of frame, wheeled axle of the outside journal type, journal housing, and lateral motion resisting and centering means disposed at the outer side of the frame and so constructed and so positioned relative to the housing that the conventional opening at the front of the housing is left free for access to the interior of the housing and the housing is left free for removal from the frame without detachment of any of the parts of the resisting and centering means.

A further object is to provide the aforesaid combination in a running gear wherein the lateral motion resisting and centering means comprises a casing rigidly secured to the frame and a plunger element in said casing disposed in operative relation with said housing.

A further object is to provide the aforesaid combination in a running gear of the so-called SKF type of roller bearing, which type is characterized by associating the housing with the axle for angular movement of the axle in a vertical plane relative to the housing, said combination including means adapted to hold the housing against angular movement relative to the frame and to permit lateral and vertical movements of the housing with corresponding movements of the axle relative to the frame.

Other and further objects and advantages achieved by this invention will be apparent from the following description of approved embodiments thereof and the claims appended hereto.

Figure 3:
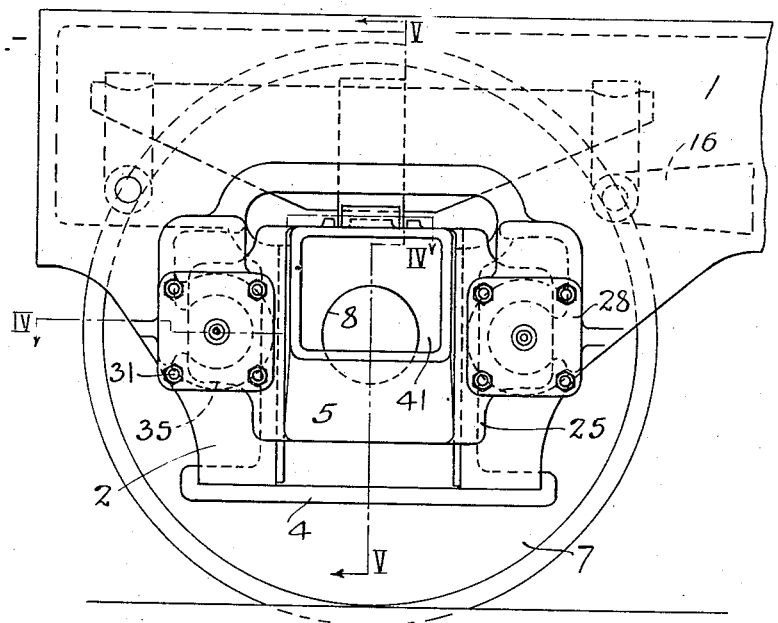
Figure 4:
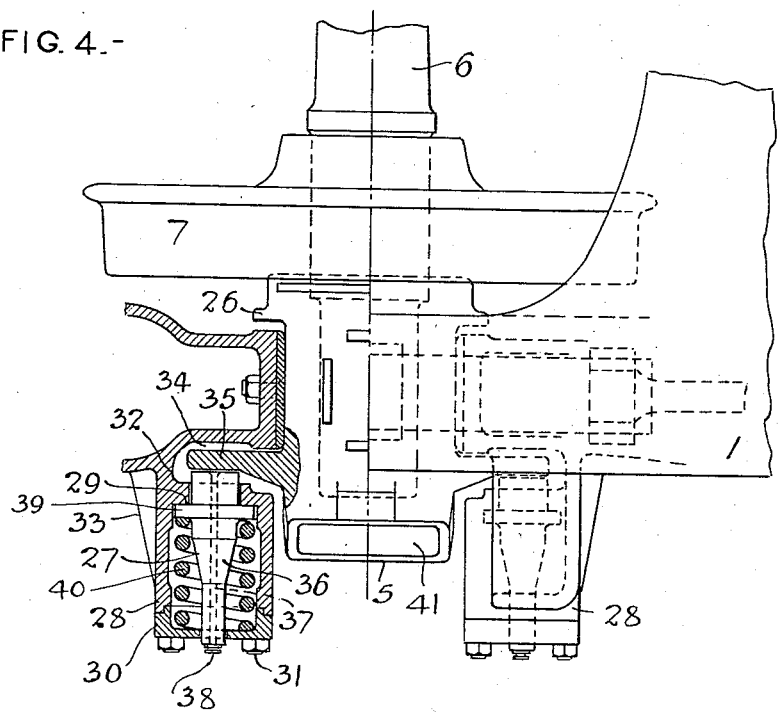

In the accompanying drawings Figure 1 is a diagrammatic plan view of a conventional type of truck such as employed on railway tenders, showing the present invention; Fig. 2 is a side elevation of the truck shown in Fig. 1; Fig. 3 is an enlarged side elevation of an end portion of the truck, the axle journals being of the frictional type; Fig. 4 is a fragmentary view of the part of the truck shown in Fig. 3, the right hand portion being a plan view and the left hand portion a partial sectional view on the line IV—IV of Fig. 3; Fig. 5 is a fragmentary view, taken on the line V—V of Fig. 3, showing the axle and part of a wheel in elevation; Fig. 6 is a view similar to Fig. 5, with the journal housing indicated in dot and dash lines and other parts added; Fig. 7 is an enlarged fragmentary section, on the line VII—VII of Fig. 8, of the invention wherein roller bearings of the so-called SKF type are employed in the truck, the wheel being partly broken away and parts being shown in plan; Fig. 8 is a view, on a reduced scale, of the end portion of the truck shown in Fig. 7, the right hand portion being a side elevation and the left hand portion showing parts in section on the line VIII—VIII of Fig. 7; Fig. 9 is a fragmentary section taken on the line IX—IX of Fig. 8, parts being shown in elevation and the wheel being partly broken away; Fig. 10 is a fragmentary section, on a reduced scale, taken on the line X—X of Fig. 7; Fig. 11 is an elevation of a structural detail of the portion shown in Fig. 10, viewed from the right thereof, providing connecting means between the axle housing and frame; and Fig. 12 is a plan view of the detail shown in Fig. 11.

Referring to Figs. 1 to 6 inclusive, here is shown, for illustrative purposes only, an eight wheel truck of a conventional type for a railway tender of a locomotive, which comprises briefly a frame 1 having end pedestals 2 providing openings 3 having at their bottoms closures 4, load supporting journal housing 5 disposed in the openings for vertical and lateral movements relative to the frame, end axles 6, wheels 7 secured thereon, and axle journals 8 extending from the outer face of the wheels outwardly within the housings, the truck being of the outside journal type.

The inner axles and their associated parts each comprises an axle 9, wheels 10 secured thereon, outside journals 11, and load supporting journal housings 12 for the journals 11 disposed in openings 13 provided by the pedestals 14, the openings being provided at their bottom open ends with closures 15.

All of the housings are adapted for vertical movement relative to the frame and are connected thereto and to each other through spring rigging 16. The bolster 17, flexibly connected to the frame, transmits the load from the superstructure (not shown) to the frame through a center plate 18 carried by the bolster.

The inner axles 9 are comparatively close to the center plate 18, the wheels 10 thereby having a comparatively small wheel base. Therefore there is no provision for any appreciable lateral movement of these axles relative to the frame as none is required, and accordingly the axles have at their ends the usual collars 19 provided in such instances.

The housings 5 for the end axles are provided with the usual type of friction bearings (Fig. 5), each of which comprises a bearing member 20 and a wedge 21, for transmitting the load from the housing to the axle. The bearing member 20 at its inner end seats against a shoulder 22 formed on the axle and the wedge 21 seats at its inner end against a flange 23 formed on the bearing member and is held against outward movement by a lug 24 formed on the housing. The axle at its end is collarless. By this construction the axle may have axial movement away from a housing, but should it move from normal central position in a direction toward a housing it will carry the housing and bearing with it. In other words the axle, in moving axially from normal central position, will move away from one housing and will carry the other housing with it. The housings 12 may be provided with the same type of friction bearing as the housings 5 or any other type of bearing desired.

The wheels 7 of the end axles 6 have a very considerable wheel base and to facilitate their passing safely over curved track provision is made to allow the axles to be laterally displaced from their normal central positions, that is to say to move axially relative to the frame a suitable distance, all of which is according to usual practice. To provide for this the housings 5 have outer flanges 25 that normally overlap their adjacent pedestals 2 with a working clearance, and inner flanges 26 (best seen in Fig. 4) which are spaced an appreciable distance from their adjacent pedestals. These flanges operate to fix the housings against inward movement when the axle moves in a direction therefrom but permit outward movement with the axle when the axle moves in a direction theretoward.

A lateral motion resisting and centering device, indicated generally by the reference numeral 27, is disposed outwardly of the frame at each side of each of the housings 5. Each device comprises a casing 28 having an open inner end wall 29 and an open detachable outer end wall 30 secured to the adjacent walls of the casing by bolts 31. The casing is cast integral with the frame, the connection being through the wall 32 and suitable bracings 33 disposed at the side of the casing remote from the housing, the inner end wall of the casing being spaced from the frame to provide a slot 34 therebetween open at its side adjacent the axle. The housing is provided at each side with a flange 35, which in the present instance is an extension of the flange 25, which extends into the slot 34 adjacent thereto through the open side thereof to assume a position opposite the opening in the end wall 29.

Each of the casings has a plunger element 36, the inner end of which extends through the opening in the wall 29 and is in operative relation with a flange 35. The outer end of the plunger element extends through the opening in the outer end wall 30 which serves as a guide. The element is provided with a lubricant passageway 37 extending from end to end for lubricating the engaging faces of the element and flange 35, the passageway being closed at its outer end by a lubricant fitting 38. The plunger element is provided with a collar 39 secured on the body of the element or formed integral therewith, the collar normally bearing against the inner face of the end wall 29 to serve as a stop to limit the movement of the plunger element toward the frame, and a helical compression spring 40 is mounted on the plunger element, having its outer end bearing against the outer end wall of the casing and its inner end bearing against the collar.

The housing, at its outer end, is provided, as is usual, with an opening 41 which is covered by a lid (not shown). The opening is for easy access to the interior of the housing so that inspection may be made, the parts lubricated and damaged parts, such as the bearing or wedge, removed and replaced by other parts.

From the foregoing it will be seen that the lateral motion resisting and centering devices are so constructed and so positioned as to leave the housing opening entirely free. Furthermore, it will be noted that the lateral motion resisting and centering device in no way connects the housing to the frame, that is to say the device has no part hindering the free removal of the housing from the frame or, otherwise stated, has no part that would have to be removed before the housing could be removed from the frame or before the housing could be opened at the front thereof for access to the interior. It should here be noted that these advantageous features, providing freedom from obstruction at the front of the housing and freedom of removal of the housing from the frame, are equally present in the construction shown in Figs. 7 to 12 later to be described.

While the foregoing description of the present embodiment has been chiefly directed to one side of the vehicle it will be understood that it applies to both sides as the construction is the same at each side and that the same remarks apply as to the construction shown in Figs. 7 to 12.

The operation of the lateral motion resisting and centering means of the present embodiment is as follows: Assuming that the wheels of the axle 6 shown in Fig. 4 are entering or passing through curved track, and that the flange of the wheel opposite the wheel 7 shown in Fig. 4 is receiving thrust from the track over which it is travelling, the force thus produced against the wheel flange will move the axle, with its wheels, axially in a direction toward the side of the frame shown in Fig. 4. The housing on said opposite side of the frame remains stationary as to lateral movement, the axle merely moving axially relative thereto but, as aforestated, the housing on the side of the vehicle shown in Fig. 4 will be moved by the axle, due to the bearing connection, as aforedescribed. In other words the shock imparted to the wheel flange will be transmitted to this housing moving it laterally outward. This movement however will be yieldingly resisted and cushioned by the springs 40 as the flanges 35 of the housing engage the plunger elements tending to move them outwardly. Therefore all lateral thrusts imparted to the axles 6 in either direction are yieldingly resisted and cushioned by the springs toward which the thrust is directed and moreover the springs 40, by their reaction, return the displaced plunger elements and housing to their normal positions and the axle to its normal central position. Normally the flanges 35 have working clearance with the ends of the plunger elements, the springs have initial compression, and this compression may be varied by insertion of one or more washers between each collar 39 and the adjacent end of the adjacent spring.

Referring now to Figs. 7 to 12 inclusive, here is shown a form of the invention employed in connection with the so-called SKF type of roller bearing. This bearing, indicated generally by the reference numeral 28''', and the housing 5''' adapted therefore are of well-known constructions, and therefore require no special description here except to mention the main general characteristics which bear on the present invention. These are that the frictionless bearing, which involves a spherically shaped outer raceway 50 and correspondingly shaped rollers 51, is so connected to the housing 5''' and axle 6''' that the housing must move with the axle when it moves laterally (axially). Furthermore this frictionless bearing, due to the spherically shaped outer raceway and its engaging rollers, so connects the housing with the axle that the axle is permitted angular movement in a vertical plane relative to the housing.

To prevent the housing from following the axle during this tilting, or from having independent tilting movement relative to either the axle or frame, a space is provided between a side of the housing and the inner face of the pedestal 2''' adjacent thereto. Such a space is provided at each side of each housing and a plate or shoe 52 is disposed in each space. Each shoe is provided with an outer vertical flange 53 overlapping the outer face of the adjacent pedestal and an inner vertical flange 53 overlapping the inner face of the adjacent pedestal, the flanges making a working fit with the pedestal to permit vertical relative movement therebetween. The plate or shoe is further provided with a horizontal flange 54 along its top edge overlapping the adjacent top face of the housing and a flange 55 along its bottom edge overlapping the adjacent bottom face of the housing, the flanges 54 and 55 making a working fit with the housing to permit the housing to move laterally with the axle relative to the shoe and frame and to move vertically with the axle and shoe relative to the frame. Each housing is provided with inner and outer flanges 56 overlapping and suitably spaced from the respective flanges of the shoes 52.

The housing is provided with a detachable closure 57 of the usual type, closing the outer end thereof and secured thereto by bolts (not shown). The cover is thus rendered easily removable to afford access to the interior of the housing. Lateral motion resisting and centering devices 27''' (structurally similar to the devices 27 shown in Fig. 4) are formed integral with the housing, one at each side of the closure 57, the inner face of the casing of each device being substantially in the plane of the inner face of the adjacent flange 56. The two devices are preferably, as in Fig. 3, located in the horizontal center plane of the adjacent axle. The plunger elements 36''' are disposed in operative relation with the flanges 53 adjacent thereto.

The shoes 52 move vertically with the plunger elements, thus eliminating frictional or sliding engagement therebetween. The shoes 52 have vertical sliding movement relative to their adjacent pedestals 2''' and the adjacent housing has lateral sliding movement relative to the shoes, and accordingly lubricating means for the engaging surfaces of these parts are provided. In the present instance to provide the lubrication the shoe is formed with a horizontal bore 58 through its top end portion above the engaging face of the flange 54 and is open to this face through orifices 59, and to the face of the shoe adjacent the pedestal through orifices 60. The bore 58 is closed at one end and provided at its other end with a lubricant fitting 61. In an obvious manner the bore 58 will serve as a chamber for lubricant which will pass through the orifices 59 and 60 and lubricate all the working faces of the shoe 52 and the faces adjacent thereto.

In the operation of this present construction, when a wheel flange receives the lateral thrust the axle is moved axially (laterally), the housings and casings moving therewith, the casings on one side of the vehicle moving in a direction away from the frame and the casings on the other side moving in a direction toward the frame. It is the springs of the devices 27''' (when moving toward the frame) that operate, through the co-action of their plunger elements 36''' with the frame, to yieldingly resist the force produced by the thrust, to cushion the lateral movement and to also restore the parts to their normal positions. In the present construction, as already stated, the housing at all times is held against tilting movement relative to the frame, the axle is permitted tilting movement relative to the housing and frame, and the plunger elements engage the shoes 52 which move vertically therewith.

In the present invention the housings are permitted lateral movement relative to the frame, which is limited in extent, the means for limiting such movement usually being the flanges formed on the housings which have been heretofore referred to.

While the invention has general application it is especially useful in connection with the end axles of railway vehicle trucks, and while a four axle truck has been shown in Figs. 1 and 2, it will be understood that the invention is equally applicable to trucks having any desired number of axles. In a two axle truck obviously the axles would be considered as the end or outer axles and there would be no inner axles as in a four axle truck. In a three axle truck there will be but one inner axle and this will usually be in line with the center plate.

In the drawings the spring-contained casings secured to the frame (see Fig. 4) have been shown in connection with a friction bearing between the housings and axle, but it will be understood that frictionless bearings of the SKF type of bearings with their respective associated parts, may also be employed in connection with casings secured to the frame, in which case the housing, instead of moving inward as in Fig. 7, will move outward, similar to the housing in Fig. 4, in its operation with the plunger elements, the springs of these elements resisting this outward movement.

It will be understood that many and various changes and modifications in form, arrangement of parts and details of construction may be made without departing from the spirit of the invention and that all such changes and modifications as fall within the scope of the appended claims are contemplated as a part of this invention.

The invention claimed and desired to be secured by Letters Patent is:

1. In a railway vehicle of the outside bearing type, a side frame member having an opening; a wheeled axle; a box member, housing a portion of said axle and being provided at its front with an opening, disposed in said frame member opening for vertical movement relative to said frame member, and for lateral movement relative to said frame member responsive to wheel flange thrusts; anti-friction bearing means of the SKF type disposed between said axle portion and said box member whereby said axle can tilt in a vertical plane relative to said box member; a separate plate disposed at each side of said box member between said box member and the adjacent face of said frame member opening having means coacting with said frame member permitting said plate to move vertically and preventing said plate from moving laterally relative to said frame member and having means coacting with said box member whereby said box member is prevented from vertical tilting movement, can move laterally relative to said plates, and will move vertically with said plates; and two lateral motion resisting devices, in horizontal alignment with said axle, carried by one of said members and free from attachment to the other of said members, disposed at opposite sides of and beyond said box member front opening laterally outward beyond said frame member leaving said box member free for access through said front opening and for removal from said frame member, each of said devices comprising a plunger having an end operatively disposed opposite said other of said members for coaction therewith responsive to lateral movement of said box member in one direction relative to said frame member, a spring urging said plunger in a direction toward said other of said members, and a casing housing said plunger and said spring whereby by said coaction said last mentioned relative movement will be resisted by said spring.

2. In a railway vehicle of the outside bearing type, a side frame having an opening; a wheeled axle; a box, housing a portion of said axle and being provided at its front end with an opening, disposed in said frame opening for vertical movement relative to said frame, and for lateral movement relative to said frame responsive to wheel flange thrusts; anti-friction bearing means of the SKF type disposed between said axle portion and said box whereby said axle can tilt in a vertical plane relative to said box; a separate plate disposed at each side of said box between said box and the adjacent face of said frame opening having means coacting with said frame permitting said plate to move vertically and preventing said plate from moving laterally relative to said frame and having means coacting with said box whereby said box is prevented from vertical tilting movement, can move laterally relative to said plates, and will move vertically with said plates; and two lateral motion resisting devices, in horizontal alignment with said axle, carried by said box and free from attachment to said frame, disposed at opposite sides of and beyond said box front opening laterally outward beyond said frame leaving said box free for access through said front opening and for removal from said frame, each of said devices comprising a plunger having an end operatively disposed opposite said frame for coaction therewith responsive to inwardward lateral movement of said box relative to said frame, a spring urging said plunger in a direction toward said frame, and a casing housing said plunger and said spring whereby by said coaction said last mentioned relative movement will be resisted by said spring.

3. In a railway vehicle of the outside bearing type, a side frame having an opening; a wheeled axle adapted for vertical tilting movement and for lateral movement relative to said frame responsive to wheel flange thrusts; a box, housing a portion of said axle, disposed in said frame opening to permit lateral inward movement of said box from normal position relative to said frame with said axle when moving laterally inwardly; anti-friction bearing means of the SKF type disposed between and in engagement with said axle portion and said box thereby securing said axle and box together for unitary lateral movement while permitting said axle tilting movement; means associated with said box and frame permitting said unitary lateral movement and holding said box against tilting in a vertical plane relative to said frame, said means being held against lateral movement relative to said frame; and a lateral motion resisting device carried by said box, disposed opposite said frame at the outboard side thereof, said device coacting with said means to resist said inward lateral movement of said box.

JAMES G. BLUNT.